US012774179B2

(12) United States Patent
Lee et al.

(10) Patent No.: US 12,774,179 B2
(45) Date of Patent: Oct. 27, 2026

(54) POWDER MATERIAL MEASURING ROTARY VALVE DEVICE

(71) Applicant: Techwin Co., Ltd., Cheongju-si (KR)

(72) Inventors: Sang Hong Lee, Cheongju-si (KR); In Seok Jung, Cheongju-si (KR); Eui Jip Choi, Cheongju-si (KR); Tai Yeon Kwon, Cheongju-si (KR); Kyung Seob Lim, Daejeon (KR)

(73) Assignee: Techwin Co., Ltd., Cheongju-si (KR)

( * ) Notice: Subject to any disclaimer, the term of this patent is extended or adjusted under 35 U.S.C. 154(b) by 427 days.

(21) Appl. No.: 18/289,230

(22) PCT Filed: Apr. 29, 2022

(86) PCT No.: PCT/KR2022/006182
§ 371 (c)(1),
(2) Date: Nov. 2, 2023

(87) PCT Pub. No.: WO2022/235020
PCT Pub. Date: Nov. 10, 2022

(65) Prior Publication Data

US 2024/0327142 A1 Oct. 3, 2024

(30) Foreign Application Priority Data

May 3, 2021 (KR) ........................ 10-2021-0057041

(51) Int. Cl.
*B65G 53/46* (2006.01)
*B65G 65/48* (2006.01)
*G01F 11/24* (2006.01)

(52) U.S. Cl.
CPC .......... *B65G 65/4881* (2013.01); *G01F 11/24* (2013.01); *B65G 2201/042* (2013.01)

(58) Field of Classification Search
CPC ............ B65G 53/4633; B65G 65/4881; B65G 2201/042; G01F 11/18; G01F 11/24; G01F 11/002; G01F 11/003
(Continued)

(56) References Cited

U.S. PATENT DOCUMENTS 3,018,662 A 1/1962 Moen
5,997,220 A * 12/1999 Wormser ........... B65G 53/4616 406/67
(Continued)

FOREIGN PATENT DOCUMENTS

JP 3058836 6/1999
JP 2001-159469 6/2001
(Continued)

OTHER PUBLICATIONS

Supplementary European Search Report and the European Search Opinion Dated Feb. 25, 2025 From the European Patent Office Re. Application No. 22799063.7. (6 Pages).
(Continued)

*Primary Examiner* — Charles P. Cheyney

(57) ABSTRACT

The present invention relates to a powder material measuring rotary valve device for quantitatively measuring and sequentially discharging a powder material in the form of powder mechanically. The powder material measuring rotary valve device comprises: a hollow measuring housing having an open entrance to which a hopper is coupled and an open exit disposed opposite to the entrance; and a distribution module which is embedded in the measuring housing to be rotatable with reference to a first virtual axis perpendicular to a virtual line connecting the entrance and the exit, and delivers a powder material introduced into the entrance to the exit, wherein a predetermined fixed quantity of the powder material introduced into the entrance according to rotation of the distribution module is separately
(Continued)

received in the distribution module and is then discharged through the exit in a first-in and first-out method.

7 Claims, 8 Drawing Sheets

(58) Field of Classification Search
USPC ................................................ 222/367, 368
See application file for complete search history.

(56) References Cited

U.S. PATENT DOCUMENTS

| | | | | |
|---|---|---|---|---|
| 7,350,674 | B2 * | 4/2008 | Hoglund | D21C 7/06 406/62 |
| 8,074,837 | B2 * | 12/2011 | Nevarez | B67D 1/07 222/367 |
| 9,523,462 | B2 * | 12/2016 | Vogel | B65G 53/4625 |
| 10,315,862 | B2 * | 6/2019 | Mallaley | F16J 15/164 |
| 2003/0199232 | A1 * | 10/2003 | Rivir | B24C 1/003 451/38 |
| 2005/0247734 | A1 * | 11/2005 | Kato | B65G 53/4633 222/190 |
| 2005/0269369 | A1 * | 12/2005 | Pfeiffer | B65G 53/4633 222/367 |
| 2008/0277512 | A1 * | 11/2008 | Vuijk | A47F 1/035 241/101.8 |
| 2009/0142147 | A1 * | 6/2009 | Pope | B65G 43/08 406/52 |
| 2011/0068121 | A1 * | 3/2011 | Frei | A47J 31/404 222/1 |
| 2020/0256715 | A1 * | 8/2020 | Treitel | G01F 11/24 |
| 2021/0018352 | A1 * | 1/2021 | Hinner | G01F 11/003 |

FOREIGN PATENT DOCUMENTS

| | | |
|---|---|---|
| JP | 2002-211746 | 7/2002 |
| JP | 6667992 | 3/2020 |
| KR | 10-2000-0000967 | 1/2000 |
| KR | 20-0350681 | 5/2004 |
| WO | WO 95/11429 | 4/1995 |
| WO | WO 2022/235020 | 11/2022 |

OTHER PUBLICATIONS

International Search Report and the Written Opinion Dated Aug. 17, 2022 From the International Searching Authority Re. Application No. PCT/KR2022/006182 and Its Translation of Search Report Into English. (11 Pages).

* cited by examiner (a)

(b)

(a)

(b)

POWDER MATERIAL MEASURING ROTARY VALVE DEVICE

RELATED APPLICATIONS

This application is a National Phase of PCT Patent Application No. PCT/KR2022/006182 having International filing date of Apr. 29, 2022, which claims the benefit of priority of Republic of Korea Patent Application No. 10-2021-0057041 filed on May 3, 2021. The contents of the above applications are all incorporated by reference as if fully set forth herein in their entirety.

FIELD AND BACKGROUND OF THE INVENTION

The present invention relates to a powder material measuring rotary valve device, and more particularly, to a powder material measuring rotary valve device for mechanically and quantitatively measuring and sequentially discharging a powder material in the form of powder.

Recently, interest in energy storage technology has been increasing.

In general, as the field of application expands to home appliances such as mobile phones, camcorders, laptops, and desktop computers, and even energy of electric vehicles, efforts for research and development of electrochemical devices are becoming more and more specific.

Among various electrochemical devices, aqueous electrolyte-based lithium secondary batteries and capacitors that are applicable to fields requiring high output characteristics are attracting attention.

These electrochemical devices generally include a positive electrode, a negative electrode, and a separator interposed between the positive electrode and the negative electrode. In this case, the positive electrode and the negative electrode are generally manufactured by a method of applying an electrode active material slurry containing an electrode active material, a polymer binder, and a solvent dissolving the polymer binder for uniform mixing of the electrode active material to a surface of a current collector to form an electrode active material layer.

The electrode active material slurry may also further include a conductive material to improve electrical conductivity of the electrode. Meanwhile, in order to form a superior electrode, a dispersion material that uniformly disperses at least one of the electrode active material and the conductive material may be further included. This is because the shape of the electrode varies depending on the extent of dispersion of the electrode active material and the conductive material, and the performance of the battery varies accordingly.

Here, in case of an active material in the form of powder, when the active material is transferred from an input hopper to an individual storage hopper, a transfer of a quantitative amount of active material is required.

However, since measuring of the active material according to a conventional technology uses a screw that rotates intermittently, there is a problem in that the quantitative measurement of the active material is not performed clearly.

SUMMARY OF THE INVENTION

An object of the present invention is to solve a problem in the related art, and the present invention is directed to providing a powder material measuring rotary valve device for mechanically and clearly quantitatively measuring and sequentially discharging a powder material in the form of powder.

According to an exemplary embodiment for achieving the purpose of the present invention described above, a powder material measuring rotary valve device according to an embodiment of the present invention includes a hollow measuring housing having an open entrance to which a hopper is coupled, and an open exit disposed opposite to the entrance, and a distribution module rotatably embedded in the measuring housing based on a first virtual axis perpendicular to a virtual line connecting the entrance to the exit, and having a plurality of unit discharge groove portions disposed at equal intervals along a direction of rotation, wherein the powder material introduced to the entrance according to a rotation of the distribution module is separately received in a predetermined fixed quantity in each of the unit discharge groove portions and then discharged through the exit in a first-in and first-out method.

In addition, the powder material measuring rotary valve device may further include a power generation module disposed to be coaxial with, parallel to or intersecting the first virtual axis and configured to generate a rotational force for rotating the distribution module.

In addition, the powder material measuring rotary valve device may further include a rotation sensing module disposed to be coaxial with the first virtual axis and configured to detect a position of the unit discharge groove portion in the measuring housing, and a speed control module configured to adjust the rotational force generated by the power generation module according to the position of the unit discharge groove portion detected by the rotation sensing module.

In addition, the powder material measuring rotary valve device may further include a shaft coupling module disposed to be coaxial with the first virtual axis and configured to rotatably support the first virtual axis and a conversion module disposed to be coaxial with or parallel to the first virtual axis and configured to convert the rotational force for rotating the distribution module and deliver the rotational force to the distribution module.

A powder material measuring rotary valve device according to another embodiment of the present invention includes a hollow measuring housing having an open entrance to which a hopper is coupled, and an open exit disposed opposite to the entrance, a distribution module rotatably embedded in the measuring housing based on a first virtual axis perpendicular to a virtual line connecting the entrance to the exit, and having a plurality of unit discharge groove portions disposed at equal intervals along a direction of rotation, and a power generation module disposed to be coaxial with, parallel to or intersecting the first virtual axis and configured to generate a rotational force for rotating the distribution module, in which the powder material introduced to the entrance according to a rotation of the distribution module is separately received in a predetermined fixed quantity in each of the unit discharge groove portions and then discharged through the exit in a first-in and first-out method.

A powder material measuring rotary valve device according to still another embodiment of the present invention includes a hollow measuring housing having an open entrance to which a hopper is coupled, and an open exit disposed opposite to the entrance, a distribution module rotatably embedded in the measuring housing based on a first virtual axis perpendicular to a virtual line connecting the entrance to the exit, and having a plurality of unit discharge groove portions disposed at equal intervals along a direction of rotation, and a power generation module disposed to be coaxial with, parallel to or intersecting the first virtual axis and configured to generate a rotational force for rotating the distribution module, in which the powder material measuring rotary valve device further includes at least a rotation sensing module among the rotation sensing module disposed to be coaxial with the first virtual axis and configured to detect a position of the unit discharge groove portion in the measuring housing and a speed control module configured to adjust the rotational force generated by the power generation module according to the position of the unit discharge groove portion detected by the rotation sensing module, in which the powder material introduced to the entrance according to a rotation of the distribution module is separately received in a predetermined fixed quantity in each of the unit discharge groove portions and then discharged through the exit in a first-in and first-out method.

The powder material measuring rotary valve device according to one embodiment of the present invention may further include at least one of a shaft coupling module disposed to be coaxial with the first virtual axis and configured to rotatably support the first virtual axis and a conversion module disposed to be coaxial with or parallel to the first virtual axis and configured to convert the rotational force for rotating the distribution module and deliver the rotational force to the distribution module.

Here, the shaft coupling module may include at least one of an opening and closing joint member coupled to the measuring housing and rotatably supporting the first virtual axis and a shaft joint member coupled to the conversion module and rotatably supporting the first virtual axis.

Here, the opening and closing joint member may include an open/close hole portion formed in communication with a distribution opening opened at one side of the measuring housing and through which the first virtual axis passes, and may further include at least one of a bushing member configured to rotatably support the first virtual axis in the open/close hole portion such that the distribution opening is sealed, and a retainer configured to rotatably support the first virtual axis in the open/close hole portion between the bushing member and the shaft joint member such that centers of the first virtual axis and the open/close hole portion are coaxial.

Here, the conversion module may include a conversion body disposed on one side of the measuring housing, a delivery drive shaft portion rotatably coupled to the conversion body coaxially with the first virtual axis and a drive connection shaft portion rotatably coupled to the conversion body in a state that is coaxial with or parallel to a second virtual axis perpendicular to the first virtual axis and engaged with the delivery drive shaft portion wherein the delivery drive shaft portion may be detachably coupled to the distribution module to rotate together with the distribution module.

Here, the delivery drive shaft portion may include a conversion connection portion rotatably coupled to the conversion body, and a distribution coupling connection portion extending coaxially to the conversion connection portion so as to be inserted and supported in a distribution hole portion provided in the distribution module.

Here, the delivery drive shaft portion may include a support protrusion portion formed on one side of the distribution coupling connection portion and caught and supported on one side of the distribution module, and a shaft fixing member detachably coupled to the other side of the distribution coupling connection portion and caught and supported on the other side of the distribution module.

Here, the speed control module may include a detection identification portion configured to identify whether a detection signal is generated in response to an amount of rotation of the distribution module, a reception control portion configured to maintain the rotational force generated by the power generation module when the detection signal is not generated as an identification result of the detection identification portion and an adjustment control portion configured to decrease the rotational force generated by the power generation module to a preset deceleration when the detection signal is generated as an identification result of the detection identification portion.

Here, the speed control module may include a detection identification portion configured to identify whether a detection signal is generated in response to an amount of rotation of the distribution module, a reception control portion configured to maintain the rotational force generated by the power generation module when the detection signal is generated as an identification result of the detection identification portion and an adjustment control portion configured to increase the rotational force generated by the power generation module to a preset acceleration when the detection signal is not generated as an identification result of the detection identification portion.

Here, the rotation sensing module may include a sensing paddle rotatably coupled to the measuring housing via a paddle shaft portion that is coaxial with the first virtual axis and configured to be rotatable with the first virtual axis and a speed sensor configured to detect the sensing paddle, in which the sensing paddle may include a paddle body coupled to the paddle shaft portion and detection wings disposed at equal intervals on the paddle body along an outer circumferential surface of the paddle body corresponding to the unit discharge groove portion in which the speed sensor may detect the detection wings.

Here, the distribution module may include a cylindrical distribution body having a distribution hole portion formed therethrough coaxially with the first virtual axis and a plurality of partition wings formed to protrude in a normal direction of the distribution body from an outer circumferential surface of the distribution body such that two mutually adjacent unit discharge groove portions are partitioned.

Here, a scraper, which is supported in close contact or in contact with an inner wall of the measuring housing, may be provided at an end of the partition wing.

Here, at least one of the entrance and the exit may be provided with a purge portion for ventilation.

Advantageous Effects

According to the powder material measuring rotary valve device according to the present invention, the powder material in the form of powder can be mechanically and clearly quantitatively measured and sequentially discharged.

In addition, in the present invention, the distribution module is rotatably supported by the measuring housing, and the unit discharge groove portion is formed therein so that a predetermined fixed quantity of powder material is separately received.

In addition, in the present invention, through the detailed configuration of the measuring housing, the opening and closing of at least one of the distribution opening and the inspection opening can be made possible, the attachment and detachment of the distribution module in the measuring housing can be simplified, and the maintenance of the distribution module in the measuring housing can be stabilized.

In addition, in the present invention, through the configuration of the purge portion a dust explosion is prevented at least one of the entrance and the exit, the transfer of the powder material is facilitated, the powder material is quantitatively supplied to the distribution module, and the powder material is quantitatively discharged from the distribution module.

In addition, in the present invention, through the distribution module, the unit discharge groove portion can be formed inside the measuring housing to receive a predetermined fixed quantity of powder material, and the transfer of the powder material can be facilitated.

In addition, in the present invention, through the detailed configuration of the distribution module, the unit discharge groove portion can be stably partitioned so that the powder material in the unit discharge groove portion can be clearly transferred.

In addition, in the present invention, the powder material can be prevented from being stuck inside the measuring housing by the scraper, and the transfer of the powder material between the unit discharge groove portions can be prevented.

In addition, in the present invention, the shaft coupling module enables the opening and closing of at least one of the distribution opening and the inspection opening, the attachment and detachment of the distribution module in the measuring housing can be simplified, and the maintenance of the distribution module in the measuring housing can be stabilized.

In addition, in the present invention, the powder material inside the measuring housing can be prevented from leaking to the outside by the opening and closing joint member, the rotation of the distribution module can be made clear, and a flow according to the rotation of the distribution module can be prevented.

In addition, in the present invention, the delivery drive shaft portion which is the first virtual axis can be stably supported by the shaft joint member, and the rotation of the delivery drive shaft portion can be made smooth.

In addition, in the present invention, the rotational force can be adjusted by the conversion module to stably rotate the distribution module with a uniform rotational force.

In addition, in the present invention, through the detailed configuration of the conversion module, the direction of delivering the rotational force can be easily changed.

In addition, in the present invention, through the coupling relationship of the delivery drive shaft portion the distribution module, the shaft coupling module, and the conversion module can be disposed coaxially to facilitate the rotation of the delivery drive shaft portion the distribution module can be stably fixed to the delivery drive shaft portion by improving the coupling force of the delivery drive shaft portion in the distribution module, and the delivery drive shaft portion can be smoothly rotated in the shaft coupling module.

In addition, in the present invention, a stable rotational force can be generated through the power generation module and the rotational force can be clearly delivered to the conversion module.

In addition, in the present invention, the amount of rotation of the distribution module in response to the unit discharge groove portion can be easily identified through the rotation sensing module, and the identification of the position of the unit discharge groove portion with reference to the entrance and the exit can be made simple and clear.

In addition, in the present invention, through the detailed configuration of the rotation sensing module, the position detection required for adjusting the rotational speed of the distribution module is made clear, and the powder material is stably transferred by adjusting the communication relationship between the entrance, the unit discharge groove portion and the exit.

In addition, in the present invention, through the detailed configuration of the sensing paddle, the sensing position can be stably specified in response to the rotation width of the unit discharge groove portion and the adjustment of the rotational force can be made clear by improving the sensitivity of the speed sensor.

In addition, in the present invention, the unit discharge groove portion can be initially positioned corresponding to the entrance through the default setting portion, and the initialization of the powder material measuring rotary valve device can be simplified.

In addition, in the present invention, the amount of powder material delivered to the distribution module is clearly controlled through the speed control module, and a predetermined fixed quantity of powder material is input to each unit distribution groove portion.

In addition, in the present invention, the deceleration smaller than a reference rotational force is provided by the fine deceleration method, which can prevent energy waste in the power generation module 50 and facilitate control of the rotational force.

In addition, in the present invention, the acceleration greater than the reference rotational force is provided through the receptive acceleration method, which can simplify the control according to the rotation of the distribution module and facilitate the control of the rotational force.

BRIEF DESCRIPTION OF THE SEVERAL VIEWS OR THE DRAWINGS

DESCRIPTION OF SPECIFIC EMBODIMENTS OF THE INVENTION

Figure 1:
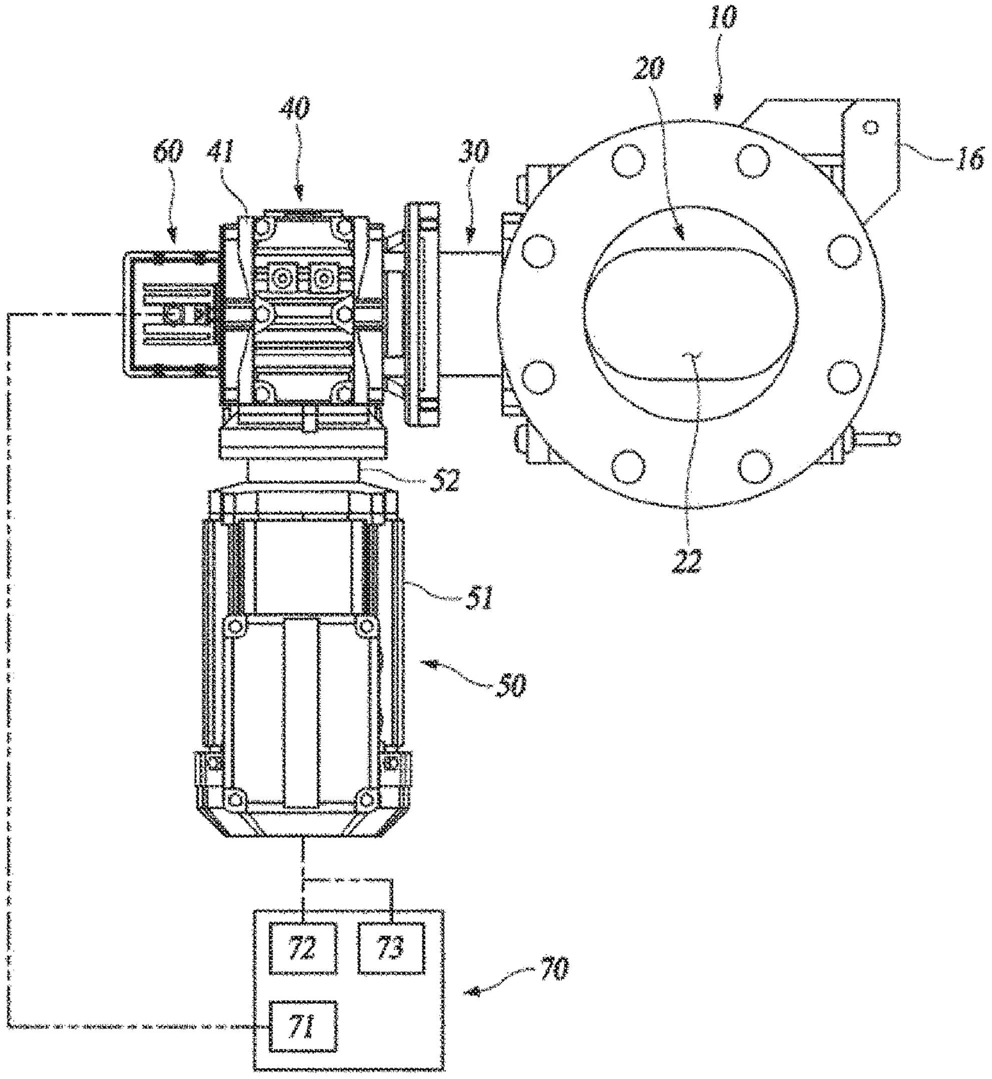
FIG. 1 is a plan view illustrating a powder material measuring rotary valve device according to one embodiment of the present invention.

Hereinafter, one embodiment of a powder material measuring rotary valve device according to the present invention will be described with reference to the accompanying drawings. In this case, the present invention is not restricted or limited by the embodiments. In addition, in the description of the present invention, the specific description of publicly known functions or configurations may be omitted in order to clarify the subject matter of the present invention.

With reference to FIGS. 1 to 9, a powder material measuring rotary valve device according to one embodiment of the present invention is configured to mechanically and clearly quantitatively measure and sequentially discharge a powder material in the form of powder, which is continuously supplied from a hopper, and includes a measuring housing 10, a distribution module 20, and the powder material measuring rotary valve device may further include a power generation module 50. Here, the powder material measuring rotary valve device according to one embodiment of the present invention may further include at least one of a rotation sensing module 60 and a speed control module 70. Here, the powder material measuring rotary valve device according to one embodiment of the present invention may further include at least one of a shaft coupling module 30 and a conversion module 40.

Then, as the distribution module 20 rotates, the powder material introduced into an entrance 11 is separately received in a predetermined fixed quantity at each unit discharge groove portion 22 of the distribution module 20 and discharged through an exit 12 in a first-in and first-out method.

The measuring housing 10 is formed as a hollow enclosure body. The measuring housing 10 has the entrance 11 opened at an upper portion thereof to which the hopper is coupled, and the exit 12 opened at a lower portion of the measuring housing 10, which is disposed in a direction opposite to the entrance 11.

Here, a virtual line is a line connecting the entrance 11 and the exit 12, a first virtual axis is an axis perpendicular to the virtual line, and a second virtual axis may be an axis perpendicular to both the virtual line and the first virtual axis. However, the second virtual axis is not limited thereto and may be parallel to the virtual line.

The measuring housing 10 may include a distribution opening formed through one side of the measuring housing 10 based on the second virtual axis perpendicular to the first virtual axis an inspection opening formed through the other side of the measuring housing 10 based on the second virtual axis perpendicular to the first virtual axis and an open/close member 15 that opens and closes the inspection opening. The distribution opening may be opened and closed by an opening and closing joint member 31.

At least one of the entrance 11 and the exit 12 may be provided with a purge portion 13 for ventilation.

The measuring housing 10 may further include at least one of an open/close hinge portion 16 to which the open/close member 15 is rotatably coupled, an open/close handle 17 provided on the open/close member 15 for grasping by a user, and an open/close fixing portion 18 configured to couple the open/close member 15 detachably to the other side of the measuring housing 10.

The reference numeral 19 that is not described is a limit switch that detects an open/close state of the inspection opening by the open/close member 15.

The distribution module 20 is rotatably embedded in the measuring housing 10 based on the first virtual axis perpendicular to the virtual line connecting the entrance 11 and the exit 12. The distribution module 20 has a plurality of unit discharge groove portions 22 disposed at equal intervals along a direction of rotation. The unit discharge groove portion 22 is provided to receive a predetermined fixed quantity of powder material. The distribution module 20 delivers the powder material introduced into the entrance 11 to the exit 12.

The distribution module 20 may include a cylindrical distribution body 21 having a distribution hole portion 21-1 formed therethrough coaxially with the first virtual axis and a plurality of partition wings 23 formed to protrude in a normal direction of the distribution body 21 from an outer circumferential surface of the distribution body 21 such that two mutually adjacent unit discharge groove portions 22 are partitioned.

In the distribution body 21, since a delivery drive shaft portion 43 coaxial with the first virtual axis is caught and supported in a state where the delivery drive shaft portion 43 is inserted in the distribution hole portion 21-1, a shaft support groove portion 21-2 is provided on one side of the distribution body 21 and a shaft coupling groove portion 21-3 is provided on the other side of the distribution body 21.

When the distribution module 20 is cut in a plane perpendicular to the first virtual axis a shape of the unit discharge groove portion 22 is not limited, may exhibit various shapes, and is preferably disposed at equal intervals along the outer circumferential surface of the distribution body 21.

Figure 4:
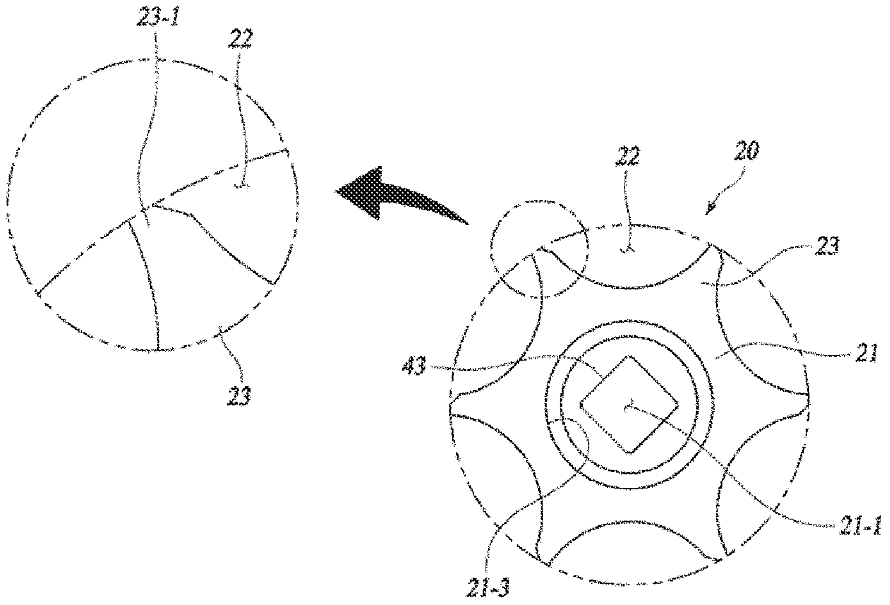
FIG. 4 is a view illustrating a distribution module in the powder material measuring rotary valve device according to one embodiment of the present invention.
Figure 5:
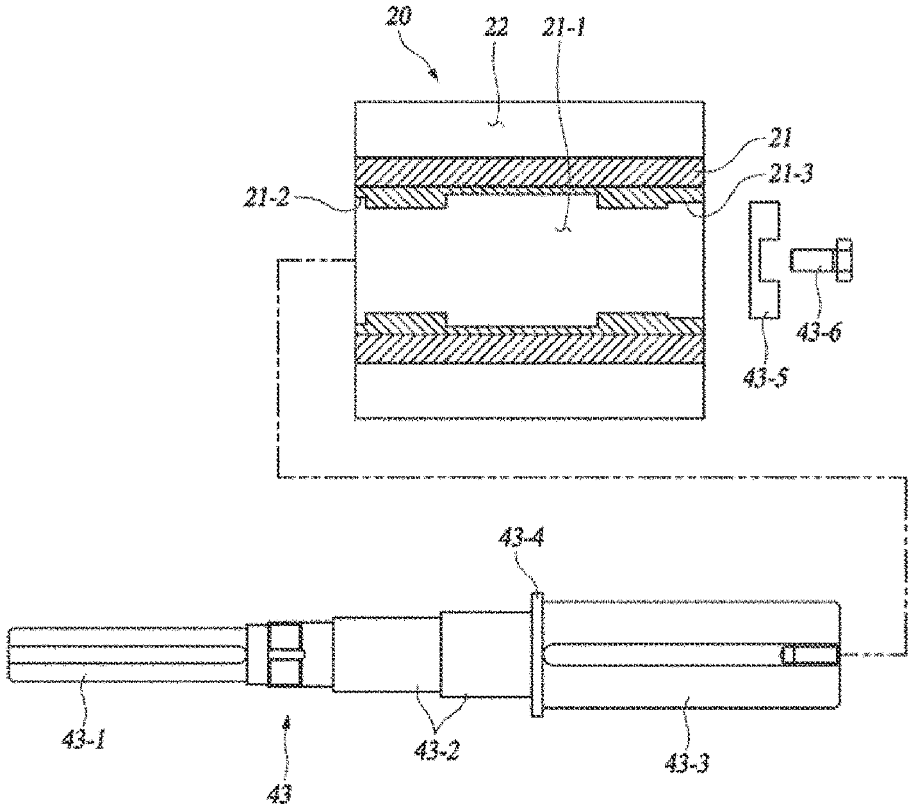
FIG. 5 is an exploded view illustrating a coupled state of the distribution module in the powder material measuring rotary valve device according to one embodiment of the present invention.

The partition wings 23 are formed to protrude in the normal direction from the outer circumferential surface of the distribution body 21 and supported in close contact or in contact with an interior of the measuring housing 10. A scraper 23-1, that is supported in closed contact or in contact with an inner wall of the measuring housing 10, may be provided to improve the adhesive force. A chamfer portion is formed on the scraper 23-1, as illustrated in FIG. 4, to reduce friction of the partition wings 23 with the interior of the measuring housing 10 and to enable smooth movement of the partition wings 23.

The shaft coupling module 30 is disposed to be coaxial with the first virtual axis. The shaft coupling module 30 rotatably supports the first virtual axis. The shaft coupling module 30 is coupled to the measuring housing 10 to open and close the distribution opening. The shaft coupling module 30 may be coaxial with the first virtual axis to connect the distribution module 20 and the conversion module 40.

The shaft coupling module 30 may include at least one of the opening and closing joint member 31 coupled to the measuring housing 10 and rotatably supporting the first virtual axis and a shaft joint member 32 coupled to the conversion module 40 and rotatably supporting the first virtual axis.

The opening and closing joint member 31 may include an open/close hole portion 31-1 that is formed in communication with the distribution opening opened to one side of the measuring housing 10 and through which the first virtual axis passes. Here, the opening and closing joint member 31 may further include at least one of a bushing member 31-2 that rotatably supports the first virtual axis in the open/close hole portion 31-1 so that the distribution opening is sealed, and a retainer 31-3 that rotatably supports the first virtual axis in the open/close hole portion 31-1 between the bushing member 31-2 and the shaft joint member 32 so that centers of the first virtual axis and the open/close hole portion 31-1 are coaxial.

Figure 2:
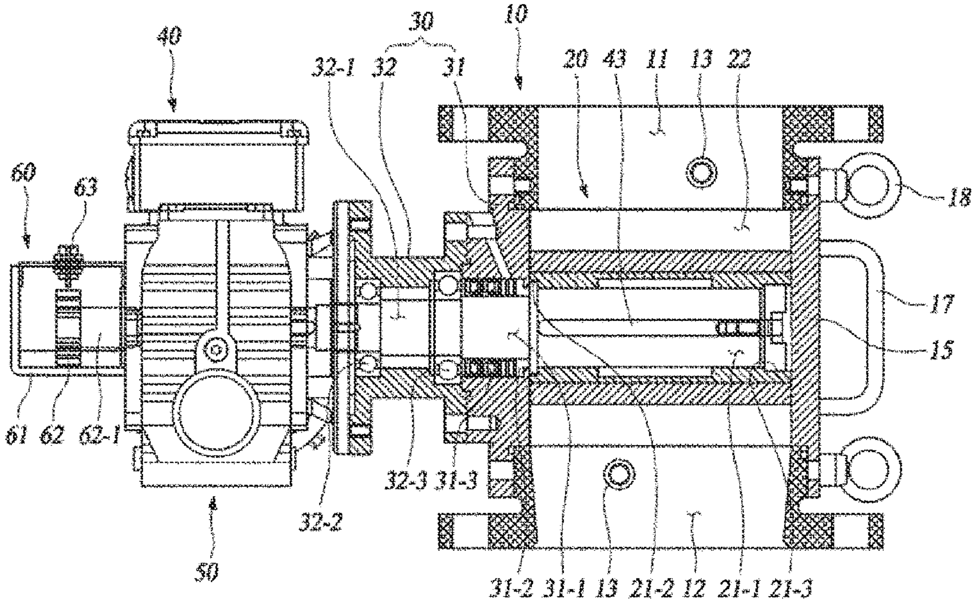
FIG. 2 is a front cross-sectional view illustrating the powder material measuring rotary valve device according to one embodiment of the present invention.
Figure 3:
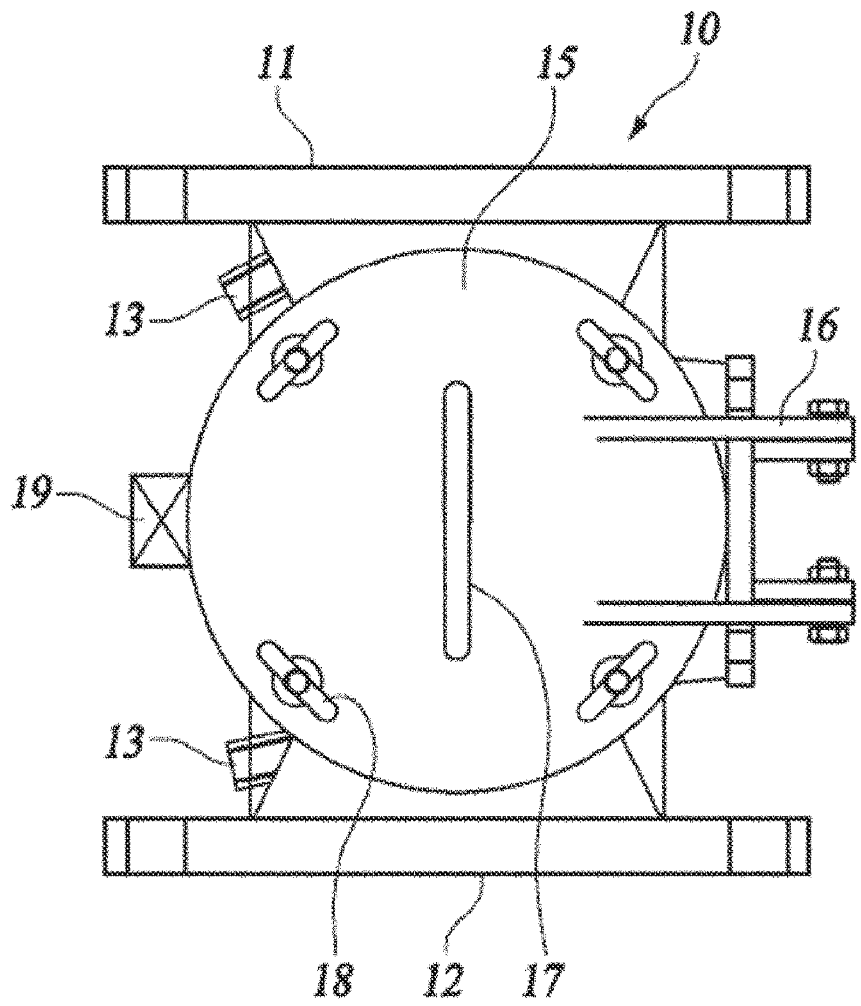
FIG. 3 is a side view illustrating the powder material measuring rotary valve device according to one embodiment of the present invention.

The shaft joint member 32 may include a shaft coupling hole portion 32-1 formed through which the first virtual axis passes, and a bearing member that rotatably supports the first virtual axis in the shaft coupling hole portion 32-1. With reference to FIG. 2, the bearing member is illustrated to include a first bearing 32-2 provided on one side of the shaft coupling hole portion 32-1 and a second bearing 32-3 provided on the other side of the shaft coupling hole portion 32-1, but is not limited thereto and the number of bearing members may be adjusted.

The conversion module 40 is disposed to be coaxial with or parallel to the first virtual axis. The conversion module 40 converts a rotational force to rotate the distribution module 20 and delivers the rotational force to the distribution module 20. In one embodiment of the present invention, the conversion module 40 is illustrated to be coupled to the shaft coupling module 30 so as to be coaxial with the first virtual axis. However, this is not limited thereto and when the shaft coupling module 30 is omitted, the conversion module 40 may be coupled to one side of the measuring housing 10.

The conversion module 40 may include a conversion body 41 disposed on one side of the measuring housing 10 and coupled to the shaft coupling module 30 or the measuring housing 10, the delivery drive shaft portion 43 rotatably coupled to the conversion body 41 coaxially with the first virtual axis and a drive connection shaft portion rotatably coupled to the conversion body 41 in a state that is coaxial with or parallel to the second virtual axis perpendicular to the first virtual axis and engaged with the delivery drive shaft portion 43. In this case, the delivery drive shaft portion 43 is detachably coupled to the distribution module 20 such that the delivery drive shaft portion 43 rotates with the distribution module 20.

The delivery drive shaft portion 43 may include a conversion connection portion 43-1 rotatably coupled to the conversion body 41, and a distribution coupling connection portion 43-3 extending coaxially to the conversion connection portion 43-1 so as to be inserted and supported in the distribution hole portion 21-1 provided in the distribution module 20.

The delivery drive shaft portion 43 may further include a shaft coupling connection portion 43-2 that coaxially connects the conversion connection portion 43-1 and the distribution coupling connection portion 43-3 so as to be rotatably inserted and supported in the shaft coupling module 30. The shaft coupling connection portion 43-2 is rotatably supported on the shaft coupling module 30.

The delivery drive shaft portion 43 may further include a support protrusion portion 43-4 formed on one side of the distribution coupling connection portion 43-3 and caught and supported on one side of the distribution module 20, and a shaft fixing member detachably coupled to the other side of the distribution coupling connection portion 43-3 and caught and supported on the other side of the distribution module 20.

Then, the support protrusion portion 43-4 is caught and supported on the shaft support groove portion 21-2, and the shaft fixing member is caught and supported on the shaft coupling groove portion 21-3.

The shaft fixing member may include a fixing bracket 43-5 that is caught and supported on the shaft coupling groove portion 213 at the other side of the distribution module 20 so as to face an end of the delivery drive shaft portion 43, and a fixing coupling portion 43-6 that detachably couples the fixing bracket 43-5 to the end of the delivery drive shaft portion 43. In one embodiment of the present invention, the fixing coupling portion 43-6 is illustrated to pass through the fixing bracket 435 and be screw-coupled to the delivery drive shaft portion 43.

The power generation module 50 is disposed to be coaxial with, parallel to or intersecting the first virtual axis. The power generation module 50 generates a rotational force to rotate the distribution module 20 by an applied power source. In one embodiment of the present invention, the power generation module 50 is illustrated to be coupled to the conversion module 40 coaxially or parallel to the second virtual axis that is perpendicular to the first virtual axis.

The power generation module 50 may include a power generation portion 51 that generates a rotational force by an applied power source, and a power shaft portion that is rotated by the rotational force at a center of the power generation portion 51 and is coaxially connected to the drive connection shaft portion of the conversion module 40.

The power generation module 50 may further include a power shaft coupling portion 52 that connects the power shaft portion to the drive connection shaft portion.

The rotation sensing module 60 is disposed to be coaxial with the first virtual axis. The rotation sensing module 60 detects a position of the unit discharge groove portion 22 in the measuring housing 10. In one embodiment of the present invention, the rotation sensing module 60 is illustrated to be coupled to the conversion module 40 coaxially with the first virtual axis. However, when the conversion module 40 is omitted, the rotation sensing module 60 may be coupled to the shaft coupling module 30 or the measuring housing 10.

In the method of measuring a powder material using the conventional rotary valve, there has been a problem in that when the operation is stopped due to a mechanical structural characteristic, a stop position of the unit discharge groove portion 22 cannot be accurately identified, and when a set measurement value is reached, the closure of the exit 12 side of the measuring housing 10 is inaccurate, resulting in a high fluctuation of the discharged amount.

However, according to the coupling relationship between the distribution module 20 and the rotation sensing module 60 and the detailed coupling state of the rotation sensing module 60 according to one embodiment of the present invention, the problem described above can be solved, and the stop position of the unit discharge groove portion 22 can be stabilized, and the closure of the exit 12 by the distribution module 20 can be simplified by clearly securing the communication between the entrance 11 and the unit discharge groove portion 22 and the communication between the exit 12 and the unit discharge groove portion 22 in a state of stopping the operation.

In addition, in the distribution module 20 according to one embodiment of the present invention, at least any one of the unit discharge groove portions 22 disposed on both sides of the unit discharge groove portion 22 in communication with the exit 12 does not communicate with the exit 12 in response to the communication of the unit discharge groove portion 22 with the entrance 11 and the communication of the unit discharge groove portion 22 with the exit 12, so that the closure and sealing of the exit 12 can be stably maintained, and an error with respect to the receiving amount of the powder material can be minimized in a space between a pair of detection wings 62-3 that are adjacent to each other and a unit receiving space of the powder material determined by the unit discharge groove portion 22.

The rotation sensing module 60 may include a sensing paddle 62 rotatably coupled to the conversion module 40 the shaft coupling module 30 or the measuring housing 10 via a paddle shaft portion 62-1 that is coaxial with the first virtual axis and a speed sensor 63 that detects the sensing paddle 62.

Here, the sensing paddle 62 may include a paddle body 62-2 coupled to the paddle shaft portion 62-1, and the detection wings 62-3 disposed at equal intervals on the paddle body 62-2 along an outer circumferential surface of the paddle body 62-2 corresponding to the unit discharge groove portion 22. Then, the speed sensor 63 may detect the amount of rotation of the distribution module as the speed sensor 63 detects the detection wings 62-3.

In the sensing paddle 62, either the paddle body 62-2 or the detection wings 62-3 may be provided with a default setting portion 62-4 to ensure that the unit discharge groove portion 22 remains stably open at the entrance 11 of the measuring housing 10, and to promote initialization of the distribution module 20.

The rotation sensing module 60 may further include a sensing body 61 coupled to the conversion module 40 the shaft coupling module 30 or the measuring housing 10 such that some or all of the sensing paddle 62 and the speed sensor are embedded therein.

Figure 6:
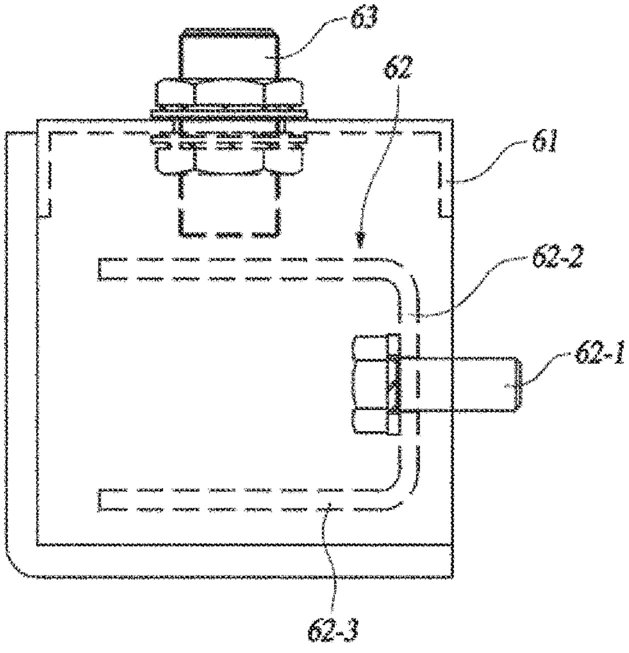
FIG. 6 is a front view (A) and a side view (B) illustrating a first coupled state of a rotation sensing module in the powder material measuring rotary valve device according to one embodiment of the present invention.
Figure 6:
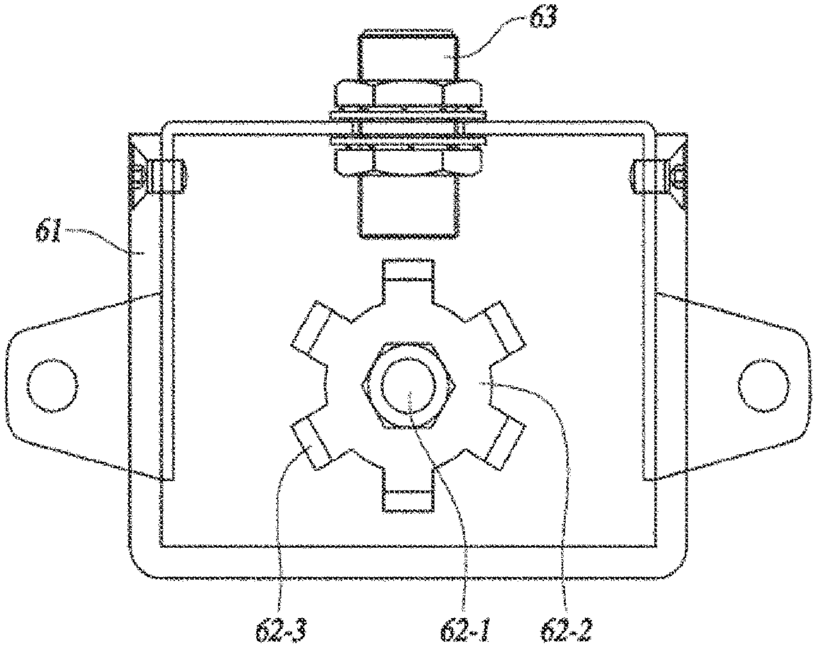

With reference to a first coupled state, as illustrated in FIG. 6, the detection wings 62-3 may be formed to be bent away from an edge of the paddle body 62-2. Further, the speed sensor 63 is coupled to the sensing body 61 by being spaced apart outside an imaginary cylinder connecting the detection wings 62-3. Then, the speed sensor 63 is spaced apart from the paddle body 62-2 and disposed to face only the detection wings 62-3, so that the speed sensor 63 may intermittently detect the detection wings 62-3 depending on the rotation of the paddle shaft portion 62-1. Since a width of the detection wing 62-3 corresponding to a rotational direction of the paddle shaft portion 62-1 forms a predetermined first detection width, the identification of the position of the unit discharge groove portion 22 relative to the entrance 11 or exit 12 is made clear, and when the rotational force of the distribution module 20 is adjusted by a speed control module 70, a predetermined fixed quantity of powder material is stably received in the unit discharge groove portion 22.

Figure 7:
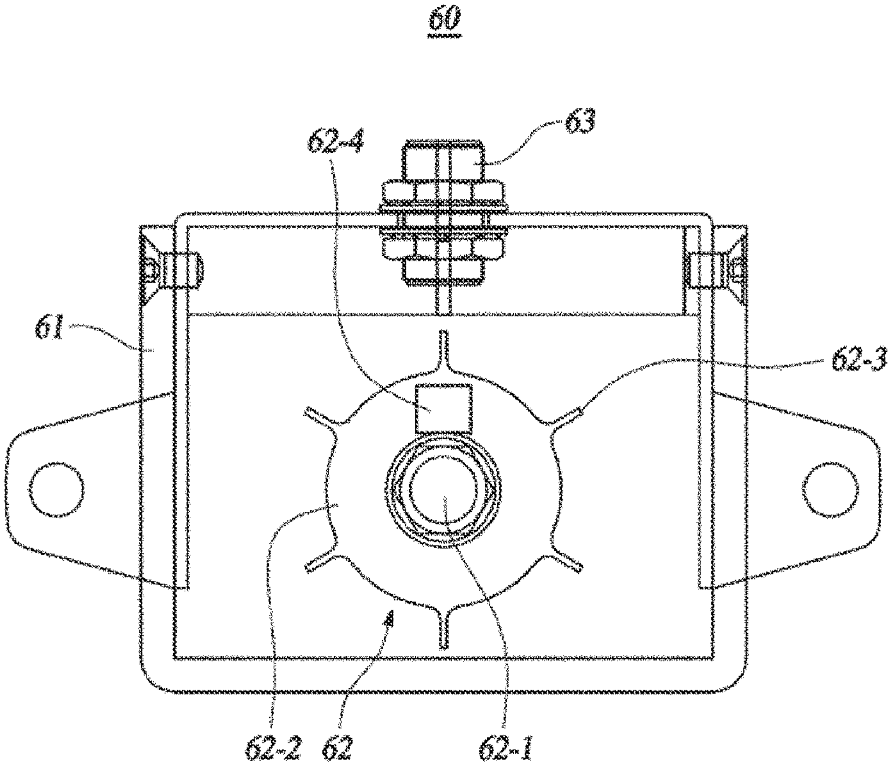
FIG. 7 is a side view illustrating a second coupled state of the rotation sensing module in the powder material measuring rotary valve device according to one embodiment of the present invention.
Figure 8:
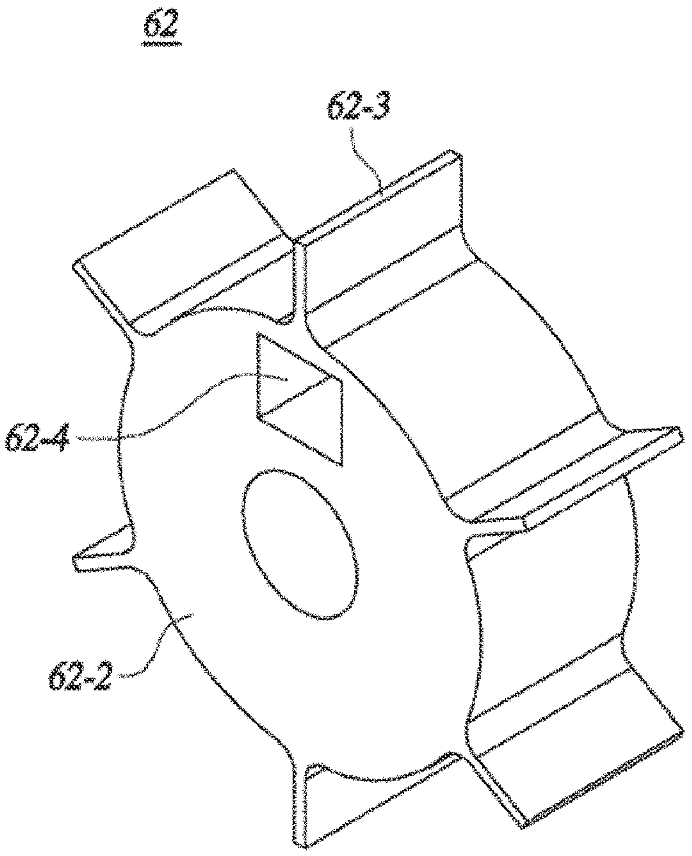
FIG. 8 is a perspective view illustrating a sensing paddle of the rotation sensing module in FIG. 7.

With reference to a second coupled state, as illustrated in FIGS. 7 and 8, the detection wings 62-3 may be formed to protrude in a normal direction from a circumferential surface of the paddle body 62-2. Further, the speed sensor 63 is coupled to the sensing body 61 by being spaced apart outside an imaginary cylinder connecting the detection wings 62-3. Then, the speed sensor 63 is disposed to face both the circumferential surface of the paddle body 62-2 and the detection wings 62-3, so that the speed sensor 63 may intermittently detect the detection wings 62-3 depending on the rotation of the paddle shaft portion 62-1. Since the width of the detection wing 62-3 corresponding to the rotational direction of the paddle shaft portion 62-1 forms a predetermined second width that is smaller than the predetermined first detection width, the identification of the position of the unit discharge groove portion 22 relative to the entrance 11 or exit 12 is made clear, and when the rotational force of the distribution module 20 is adjusted by a speed control module 70, a predetermined fixed quantity of powder material is stably received in the unit discharge groove portion 22.

Figure 9:
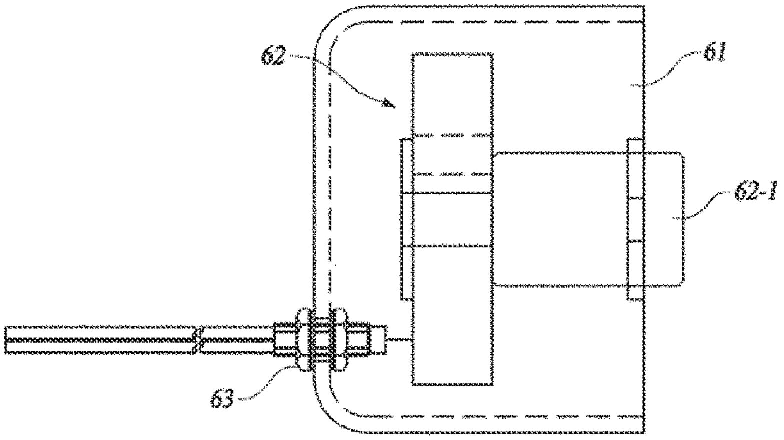
FIG. 9 is a front view (A) and a side view (B) illustrating a third coupled state of the rotation sensing module in the powder material measuring rotary valve device according to one embodiment of the present invention.
Figure 9:
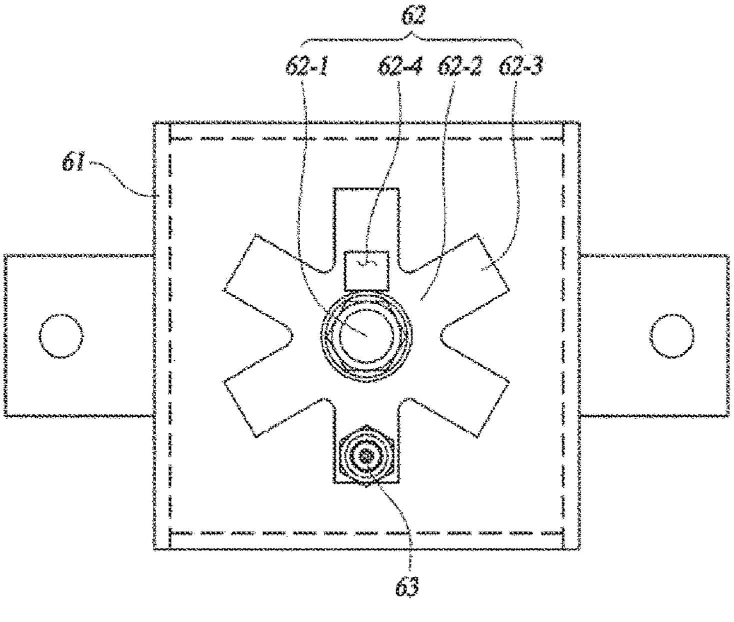

With reference to a third coupled state, as illustrated in FIG. 9, the detection wings 62-3 may be formed to protrude in a normal direction from the peripheral surface of the paddle body 62-2. Further, the speed sensor 63 is coupled to the sensing body 61 such that the speed sensor 63 faces a side surface of the paddle body 62-2. Then, the speed sensor 63 is disposed to face only the detection wings 62-3 in a direction parallel to the paddle shaft portion 62-1, so that the speed sensor 63 may intermittently detect the detection wings 62-3 depending on the rotation of the paddle shaft portion 62-1. Since the width of the detection wing 62-3 corresponding to the rotational direction of the paddle shaft portion 62-1 forms the predetermined first detection width, the identification of the position of the unit discharge groove portion 22 relative to the entrance 11 or exit 12 is made clear, and when the rotational force of the distribution module 20 is adjusted by the speed control module 70, a predetermined fixed quantity of powder material is stably received in the unit discharge groove portion 22.

With reference to the detailed coupling relationship of the rotation sensing module 60, the width of the detection wing 62-3 corresponding to the rotational direction of the paddle shaft portion 62-1, the time at which the speed sensor 63 detects the detection wings 62-3 using an interval between two adjacent detection wings 62-3, the time at which the rotational force generated by the power generation module 50 is adjusted, and the like may be adjusted, and the powder material received in the unit distribution groove portion 22 may be clearly adjusted.

The speed control module 70 regulates the rotational force generated by the power generation module 50 according to the position of the unit discharge groove portion 22 of the distribution module 20 detected in the rotation sensing module 60. A method of adjusting the rotational force in the speed control module 70 may be divided into a fine deceleration method and a receptive acceleration method. Then, through the rotation sensing module 60, the position of the unit discharge groove portion 22 may be detected, and the measured value of the powder material accumulated in the unit discharge groove portion 22 may be calculated according to the control of the speed control module 70, and a weight of the powder material per the unit discharge groove portion 22 may be converted to apply an error value according to precise measuring to a minimum.

According to the fine deceleration method, the speed control module 70 may include a detection identification portion 71 that identifies whether a detection signal is generated in response to the amount of rotation of the distribution module 20, a reception control portion 72 that maintains the rotational force generated by the power generation module 50 when the detection signal is not generated as an identification result of the detection identification portion 71, and an adjustment control portion 73 that decreases the rotational force generated by the power generation module 50 to a preset deceleration when the detection signal is generated as an identification result of the detection identification portion 71.

According to the receptive deceleration method, the speed control module 70 may include the detection identification portion 71 that identifies whether a detection signal is generated in response to the amount of rotation of the distribution module 20, the reception control portion 72 that maintains the rotational force generated by the power generation module 50 when the detection signal is generated as an identification result of the detection identification portion 71, and the adjustment control portion 73 that increases the rotational force generated by the power generation module 50 to a preset acceleration when the detection signal is not generated as an identification result of the detection identification portion 71.

In one example, since the speed control module 70 makes the rotational force of the power generation module 50 relatively smaller and causes the distribution module 20 to rotate relatively slower while the speed sensor 63 detects the detection wings 62-3 of the sensing paddle 62, the time in communication of the unit discharge groove portion 22 at the entrance 11 is relatively longer, and 85 to 90% of the unit discharge groove portion 22 at the entrance 11 maintains a communication state, so that the powder material may be sufficiently supplied to the unit discharge groove portion 22. Furthermore, since the speed control module 70 causes the rotational force of the power generation module 50 to be relatively greater and the distribution module 20 to rotate relatively faster when the speed sensor 63 does not detect the detection wings 62-3 of the sensing paddle 62, the time in communication of the unit discharge groove portion 22 at the entrance 11 becomes relatively shorter, and only a portion of the powder material delivered from the hopper (10 to 15% of the powder material received per the unit discharge groove portion 22) may be supplied to the unit discharge groove portion 22.

In another example, since the speed control module 70 causes the rotational force of the power generation module 50 to be relatively smaller and the distribution module 20 to rotate relatively slower while the speed sensor 63 detects the detection wings 62-3 of the sensing paddle 62, the powder material may be delivered to the two adjacent unit discharge groove portions 22, respectively. Furthermore, since the speed control module 70 causes the rotational force of the power generation module 50 to be relatively greater and the distribution module 20 to rotate relatively faster when the speed sensor 63 does not detect the detection wings 62-3 of the sensing paddle 62, the time in communication of the unit discharge groove portion 22 at the entrance 11 becomes relatively shorter, and one of the two adjacent unit discharge groove portions 22 is rapidly moved to the exit 12, while the other of the two adjacent unit discharge groove portions 22 has an increased communicating area with the entrance 11. However, only a portion of the powder material delivered from the hopper (10 to 15% of the powder material received per the unit discharge groove portion 22) may be supplied to the unit discharge groove portion 22.

According to the powder material measuring rotary valve device described above, the powder material in the form of powder can be mechanically and clearly quantitatively measured and sequentially discharged.

In addition, the distribution module 20 is rotatably supported by the measuring housing 10, and the unit discharge groove portion 22 is formed therein so that a predetermined fixed quantity of powder material is separately received.

In addition, through the detailed configuration of the measuring housing 10, the opening and closing of at least one of the distribution opening and the inspection opening can be made possible, the attachment and detachment of the distribution module 20 from the measuring housing 10 can be simplified, and the maintenance of the distribution module 20 in the measuring housing 10 can be stabilized.

In addition, through the configuration of the purge portion 13, a dust explosion is prevented at least one of the entrance 11 and the exit 12, the transfer of the powder material is facilitated, the powder material is quantitatively supplied to the distribution module 20, and the powder material is quantitatively discharged from the distribution module 20.

In addition, the unit discharge groove portion 22 can be formed inside the measuring housing 10 through the distribution module 20 to receive a predetermined fixed quantity of powder material, and the transfer of the powder material can be facilitated.

In addition, through the detailed configuration of the distribution module 20, the unit discharge groove portion 22 can be stably partitioned so that the powder material in the unit discharge groove portion 22 can be clearly transferred.

In addition, the powder material can be prevented from being stuck inside the measuring housing 10 by the scraper 23-1, and the transfer of the powder material between the unit discharge groove portions 22 can be prevented.

In addition, the opening and closing of at least one of the distribution opening and the inspection opening can be made possible by the shaft coupling module 30 the attachment and detachment of the distribution module 20 from the measuring housing 10 can be simplified, and the maintenance of the distribution module 20 in the measuring housing 10 can be stabilized.

In addition, the powder material inside the measuring housing 10 can be prevented from leaking to the outside by the opening and closing joint member 31, the rotation of the distribution module 20 can be made clear, and a flow according to the rotation of the distribution module 20 can be prevented.

In addition, the delivery drive shaft portion 43, which is the first virtual axis, can be stably supported by the shaft joint member 32, and the rotation of the delivery drive shaft portion 43 can be made smooth.

In addition, the rotational force can be adjusted by the conversion module 40 to stably rotate the distribution module 20 with a uniform rotational force.

In addition, through the detailed configuration of the conversion module 40, the direction of delivering the rotational force can be easily changed.

In addition, through the coupling relationship of the delivery drive shaft portion 43, the distribution module 20, the shaft coupling module 30 and the conversion module 40 can be disposed coaxially to facilitate the rotation of the delivery drive shaft portion 43, and the distribution module 20 can be stably fixed to the delivery drive shaft portion 43 by improving the coupling force of the delivery drive shaft portion 43 in the distribution module 20, and the delivery drive shaft portion 43 can be smoothly rotated in the shaft coupling module 30.

In addition, a stable rotational force can be generated through the power generation module 50 and the rotational force can be clearly delivered to the conversion module 40.

In addition, the amount of rotation of the distribution module 20 corresponding to the unit discharge groove portion 22 can be easily identified through the rotation sensing module 60, and the position of the unit discharge groove portion 22 with reference to the entrance 11 and the exit 12 can be easily and clearly identified.

In addition, through the detailed configuration of the rotation sensing module 60, the position detection required for adjusting the rotational speed of the distribution module 20 is made clear, and the powder material is stably transferred by adjusting the communication relationship between the entrance 11, the unit discharge groove portion 22, and the exit 12.

In addition, through the detailed configuration of the sensing paddle 62, the sensing position can be stably specified in response to the rotation width of the unit discharge groove portion 22, and the adjustment of the rotational force can be made clear by improving the sensitivity of the speed sensor 63.

In addition, the unit discharge groove portion 22 can be initially positioned corresponding to the entrance 11 through the default setting portion 62-4, and the initialization of the powder material measuring rotary valve device can be simplified.

In addition, the amount of powder material delivered to the distribution module 20 is clearly controlled through the speed control module 70, and a predetermined fixed quantity of powder material is input to each unit distribution groove portion.

In addition, the deceleration smaller than a reference rotational force is provided by the fine deceleration method, which can prevent energy waste in the power generation module 50 and facilitate control of the rotational force.

In addition, the acceleration greater than the reference rotational force is provided through the receptive acceleration method, which can simplify the control according to the rotation of the distribution module 20 and facilitate the control of the rotational force.

While the present invention has been described above with reference to the exemplary embodiments and the drawings, those skilled in the art may variously modify and change the present invention without departing from the spirit and scope of the present invention disclosed in the claims.

INDUSTRIAL APPLICABILITY

According to the powder material measuring rotary valve device according to one embodiment of the present invention, the powder material in the form of a powder can be mechanically and clearly quantitatively measured and sequentially discharged.

The invention claimed is:

1. A powder material measuring rotary valve device comprising:

a hollow measuring housing having an open entrance to which a hopper is coupled, and an open exit disposed opposite to the entrance;

a distribution module rotatably embedded in the measuring housing based on a first virtual axis perpendicular to a virtual line connecting the entrance to the exit, and having a plurality of unit discharge groove portions disposed at equal intervals along a direction of rotation;

a power generation module disposed to be coaxial with, parallel to, or intersecting the first virtual axis, and configured to generate a rotational force for rotating the distribution module;

a rotation sensing module disposed to be coaxial with the first virtual axis and configured to detect a position of the unit discharge groove portion in the measuring housing;

a speed control module configured to adjust the rotational force generated by the power generation module according to the position of the unit discharge groove portion detected by the rotation sensing module;

a shaft coupling module disposed to be coaxial with the first virtual axis, and configured to rotatably support the first virtual axis; and a conversion module disposed to be coaxial with or parallel to the first virtual axis, and configured to convert the rotational force for rotating the distribution module and deliver the rotational force to the distribution module, wherein the shaft coupling module includes an opening and closing joint member coupled to the measuring housing and configured to rotatably support the first virtual axis, and a shaft joint member coupled to the conversion module and configured to rotatably support the first virtual axis, wherein the opening and closing joint member includes an open/close hole portion communicating with a distribution opening opened to one side of the measuring housing and formed through the first virtual axis to pass through, and further includes at least one of: a bushing member configured to rotatably support the first virtual axis in the open/close hole portion such that the distribution opening is sealed; and a retainer configured to rotatably support the first virtual axis in the open/close hole portion between the bushing member and the shaft joint member such that centers of the first virtual axis and the open/close hole portion are coaxial, wherein the conversion module includes a conversion body disposed on one side of the measuring housing, and a delivery drive shaft portion rotatably coupled to the conversion body coaxially with the first virtual axis, the delivery drive shaft portion being detachably coupled to the distribution module to rotate together with the distribution module, wherein the delivery drive shaft portion includes a conversion connection portion rotatably coupled to the conversion body, and a distribution coupling connection portion extending coaxially to the conversion connection portion so as to be inserted and supported in a distribution hole portion provided in the distribution module, wherein the delivery drive shaft portion further includes a support protrusion portion formed on one side of the distribution coupling connection portion and caught and supported on one side of the distribution module, and a shaft fixing member detachably coupled to the other side of the distribution coupling connection portion and caught and supported on the other side of the distribution module, and wherein the powder material introduced to the entrance according to a rotation of the distribution module is separately received in a predetermined fixed quantity in each of the unit discharge groove portions and then discharged through the exit in a first-in and first-out method.

2. The powder material measuring rotary valve device of claim 1, wherein the speed control module includes:

a detection identification portion configured to identify whether a detection signal is generated in response to an amount of rotation of the distribution module;

a reception control portion configured to maintain the rotational force generated by the power generation module when the detection signal is not generated as an identification result of the detection identification portion; and an adjustment control portion configured to decrease the rotational force generated by the power generation module to a preset deceleration when the detection signal is generated as an identification result of the detection identification portion.

3. The powder material measuring rotary valve device of claim 1, wherein the speed control module includes:

a detection identification portion configured to identify whether a detection signal is generated in response to an amount of rotation of the distribution module;

a reception control portion configured to maintain the rotational force generated by the power generation module when the detection signal is generated as an identification result of the detection identification portion; and an adjustment control portion configured to increase the rotational force generated by the power generation module to a preset acceleration when the detection signal is not generated as an identification result of the detection identification portion.

4. The powder material measuring rotary valve device of claim 1, wherein the rotation sensing module includes:

a sensing paddle rotatably coupled to the measuring housing via a paddle shaft portion that is coaxial with the first virtual axis and configured to be rotatable with the first virtual axis; and a speed sensor configured to detect the sensing paddle, wherein the sensing paddle includes a paddle body coupled to the paddle shaft portion, and detection wings disposed at equal intervals on the paddle body along an outer circumferential surface of the paddle body corresponding to the unit discharge groove portion, and the speed sensor detects the detection wings.

5. The powder material measuring rotary valve device of claim 1, wherein the distribution module includes:

a cylindrical distribution body having a distribution hole portion formed therethrough coaxially with the first virtual axis; and a plurality of partition wings formed to protrude in a normal direction of the distribution body from an outer circumferential surface of the distribution body such that two mutually adjacent unit discharge groove portions are partitioned.

6. The powder material measuring rotary valve device of claim 5, wherein a scraper, which is supported in contact with an inner wall of the measuring housing, is provided at an end of the partition wing.

7. The powder material measuring rotary valve device of claim 1, wherein a purge portion for ventilation is provided in at least one of the entrance and the exit.

* * * * *